(12) United States Patent
Naelon

(10) Patent No.: US 11,514,415 B1
(45) Date of Patent: *Nov. 29, 2022

(54) EFFICIENT PROPAGATION OF USER DATA ACROSS DISPARATE SYSTEMS

(71) Applicant: United Services Automobile Association (USAA), San Antonio, TX (US)

(72) Inventor: Ashley Naelon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/877,628

(22) Filed: May 19, 2020

Related U.S. Application Data

(63) Continuation of application No. 15/477,494, filed on Apr. 3, 2017, now Pat. No. 10,699,255.

(Continued)

(51) Int. Cl.
*G06Q 40/00* (2012.01)
*G06Q 20/10* (2012.01)
(Continued)

(52) U.S. Cl.
CPC .......... *G06Q 20/102* (2013.01); *G06Q 20/04* (2013.01); *G06Q 20/14* (2013.01); *G06Q 20/40* (2013.01); *G06Q 30/04* (2013.01); *G06Q 40/00* (2013.01)

(58) Field of Classification Search
CPC ...... G06Q 20/102; G06Q 20/04; G06Q 20/14; G06Q 20/40; G06Q 30/04; G06Q 40/00
See application file for complete search history.

(56) References Cited

U.S. PATENT DOCUMENTS 5,146,403 A * 9/1992 Goodman ................. B07C 1/00
8,548,910 B1 * 10/2013 Hamilton ............... G06Q 40/02
705/42

(Continued)

FOREIGN PATENT DOCUMENTS

JP  4634685  2/2011
JP  2014041490  3/2014

(Continued)

OTHER PUBLICATIONS

Anonymous, "Moving part 2: Change of address, services to stop, organizing checklist," House Mix, www.housemixblog.com, 2013 (Year: 2013).*

(Continued)

*Primary Examiner* — Alexander G Kalinowski
*Assistant Examiner* — William B. Bunker
(74) *Attorney, Agent, or Firm* — Fish & Richardson P.C.

(57) ABSTRACT

Methods, systems, and apparatus, including computer programs encoded on computer storage media, for fluid blob tracking. One of the methods includes receiving from a user device, a request to change an address with a financial institution. The method includes accessing an electronic bill pay system of the financial institution. The method includes identifying an external party to notify of the change of address based on data in an electronic bill pay system. The method also includes notifying the external party of the change of address, wherein the external party is independent of the financial institution.

20 Claims, 6 Drawing Sheets

Related U.S. Application Data

(60) Provisional application No. 62/317,849, filed on Apr. 4, 2016.

(51) Int. Cl.
  *G06Q 20/40* (2012.01)
  *G06Q 20/04* (2012.01)
  *G06Q 20/14* (2012.01)
  *G06Q 30/04* (2012.01)

(56) References Cited

U.S. PATENT DOCUMENTS

| | | | |
|---|---|---|---|
| 10,460,299 B1* | 10/2019 | Nolte | G06Q 20/405 |
| 2006/0167822 A1* | 7/2006 | Krause | G06Q 10/107 |
| | | | 705/75 |
| 2009/0157470 A1* | 6/2009 | Rathbun | G06Q 50/32 |
| | | | 705/7.12 |
| 2010/0036769 A1* | 2/2010 | Winters | G06Q 20/102 |
| | | | 705/40 |
| 2010/0094839 A1* | 4/2010 | Brach | G06Q 10/107 |
| | | | 707/705 |
| 2010/0102116 A1* | 4/2010 | Rochelle | B07C 3/20 |
| | | | 283/67 |
| 2014/0244482 A1* | 8/2014 | Joa | G06Q 10/10 |
| | | | 705/39 |
| 2014/0244490 A1* | 8/2014 | Miller | G06Q 20/102 |
| | | | 705/40 |
| 2016/0019517 A1* | 1/2016 | Kirsh | G06Q 20/047 |
| | | | 705/24 |
| 2016/0189121 A1* | 6/2016 | Best | G06Q 20/405 |
| | | | 705/40 |
| 2017/0048250 A1* | 2/2017 | Gifford | H04L 63/102 |
| 2017/0270358 A1 | 9/2017 | Salemizadeh et al. | |

FOREIGN PATENT DOCUMENTS

| | | | | |
|---|---|---|---|---|
| WO | WO 91/06915 | * | 5/1991 | G06F 15/21 |
| WO | WO 2006/105559 | | 10/2006 | |
| WO | WO-2006105559 A2 | * | 10/2006 | G06Q 10/00 |
| WO | WO-2011100529 A1 | * | 8/2011 | G06Q 20/102 |

OTHER PUBLICATIONS

Inspector General, "The Changing Change of Address System," retrieved from www.uspsoig.gov/blog/changing-change-address-system, 2009, 17 pages.

* cited by examiner

EFFICIENT PROPAGATION OF USER DATA ACROSS DISPARATE SYSTEMS

CLAIM OF PRIORITY

This application is a continuation application of and claims priority under 35 U.S.C. § 120 to U.S. application Ser. No. 15/477,494, filed on Apr. 3, 2017, which claims priority to U.S. Patent Application Ser. No. 62/317,849, filed on Apr. 4, 2016, the entire contents of each of which are incorporated herein by reference.

BACKGROUND

A typical individual in the United States changes their residence between 11 and 12 times during their lifetime. People move for a large number of reasons including economic opportunities, health status, social relationships, and exposure to crime and disorder. While moving is normally a relatively happy event, moving requires the coordination of several different activities (for example, a new residence must be obtained, possessions must be packed, friends and businesses must be notified, mortgages and loans must be secured, schools must be found, friends are left behind).

SUMMARY

This specification describes technologies relating to changing user data.

In general, one innovative aspect of the subject matter described in this specification can be embodied in methods that include the actions of receiving from a user device, a request to change an address with a financial institution. The methods include the actions of accessing an electronic bill pay system of the financial institution. The methods include the actions of identifying an external party to notify of the change of address based on data in an electronic bill pay system. The methods also include the actions of notifying the external party of the change of address, wherein the external party is independent of the financial institution The foregoing and other embodiments can each optionally include one or more of the following features, alone or in combination.

In aspect 2 according to aspect 1, the methods can include the actions of accessing at least one financial statement associated with at least one payee in the bill pay system, and identifying a second external party to notify of the change of address based on data in the at least one financial statement.

In aspect 3 according to any of aspects 1 and 2, the at least one financial statement may be a credit card statement.

In aspect 4 according to any of aspects 1, 2, and 3 the methods include the actions of determining the external party is associated with a service for the initial address, and notifying the external party to cancel an account for the user with the external party.

In aspect 4 according to any of aspects 1, 2, 3, and 4 the methods include the actions of establishing new service for a new address.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Particular embodiments of the subject matter described in this specification can be implemented so as to realize one or more of the following advantages. The moving process can be simplified. Change of address information may be propagated from one system to another using automated agents. Addresses may be changed with multiple system without requiring the generation and display of multiple user interfaces, thereby conserving system resources and increasing computer efficiency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Moving a residence is a stressful activity. There are many different tasks that need to be completed. One important, but frequently neglected task is the notification of change of address. People forget to notify some people about the change of address. The system described herein can simplify the moving process by efficiently propagating change of address requests across multiple organizations.

Figure 1:
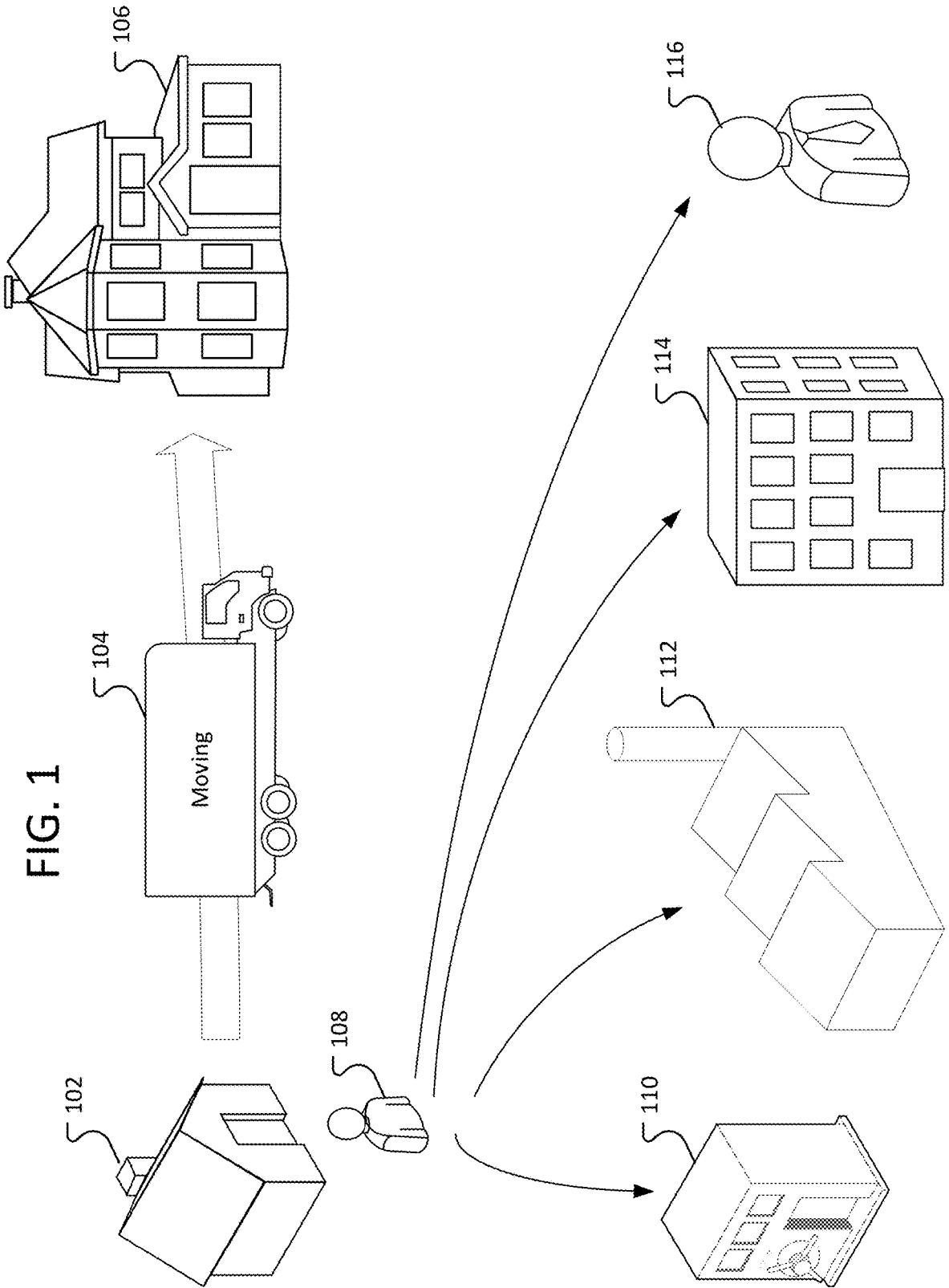
FIG. 1 illustrates an example of an individual moving their residence.

FIG. 1 illustrates an example of an individual 108 moving their residence. The individual 108 schedules a move from a current resident 102 to a new residence 106. In addition to scheduling the physical move (represented by the moving van 104). The 108 as to notify numerous parties about the move, including but not limited to, financial institutions 110, utility companies 112, stores 114, as well as miscellaneous other individuals and companies 116 (such as day care providers, print media companies, etc.).

Currently, a user has to notify each company and individual separately. It can be a complicated, time consuming, and error prone notification process. Frequently, some entity or another gets missed. Failure to notify a company about a move can result in a financial loss. For example, a financial account may be determined to be abandoned.

At the same time, financial institutions, especially banks and credit card companies, have a great deal of information that can be used to identify the companies to notify about a change of residence.

Figure 2:
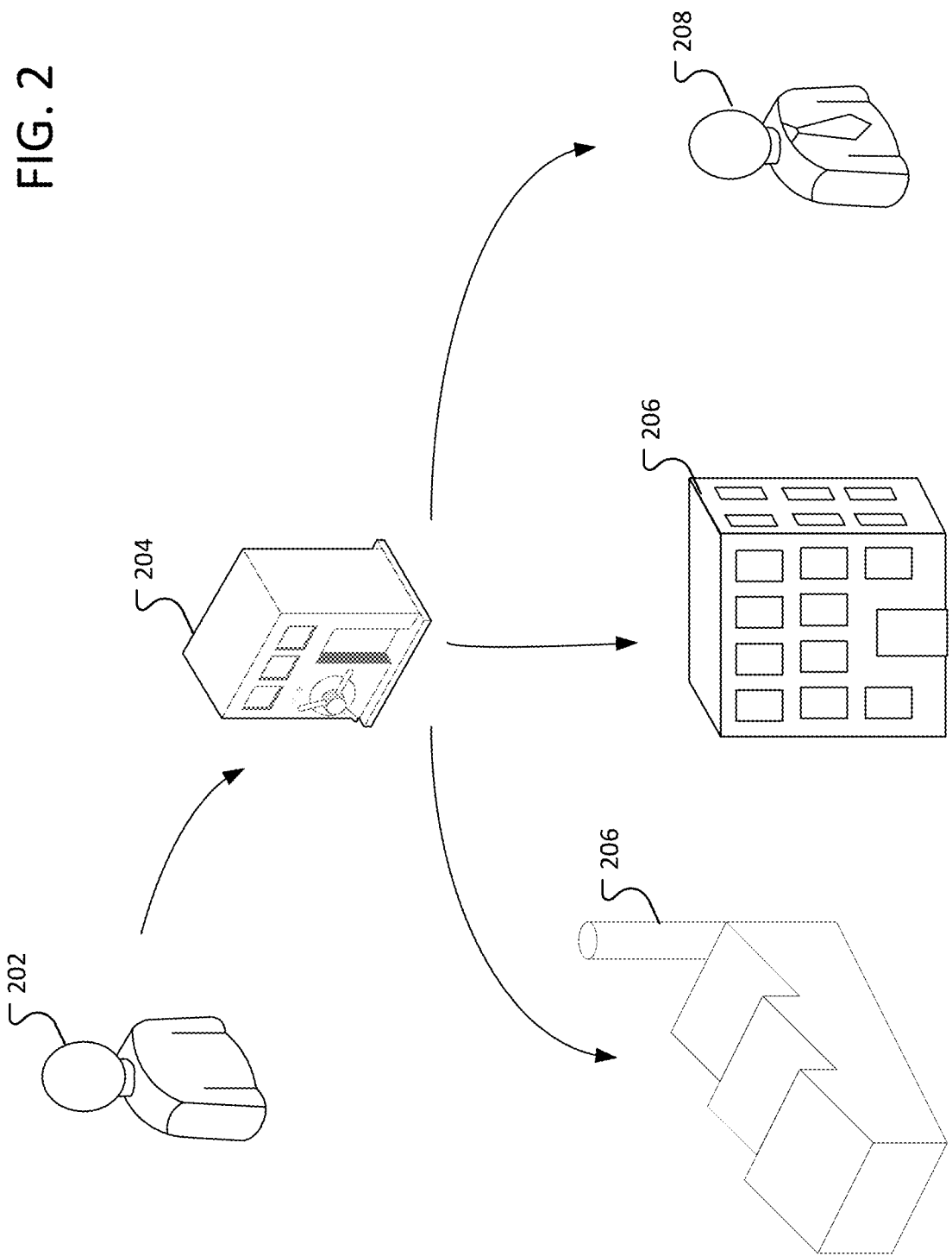
FIG. 2 illustrates an example of delegating the notification of a change of address to a financial services company.

FIG. 2 illustrates an example of delegating the notification of a change of address to a financial services company. The user 202 notifies a financial services company 204 about a change of address. Using information available from the user's accounts, the financial services company 204 can identify other parties (such as the utility company 206, the stores 206, and other individuals/companies 208) that may be notified about the change of address.

The financial services company 204 can notify the other parties on behalf of the user 202.

Figure 3:
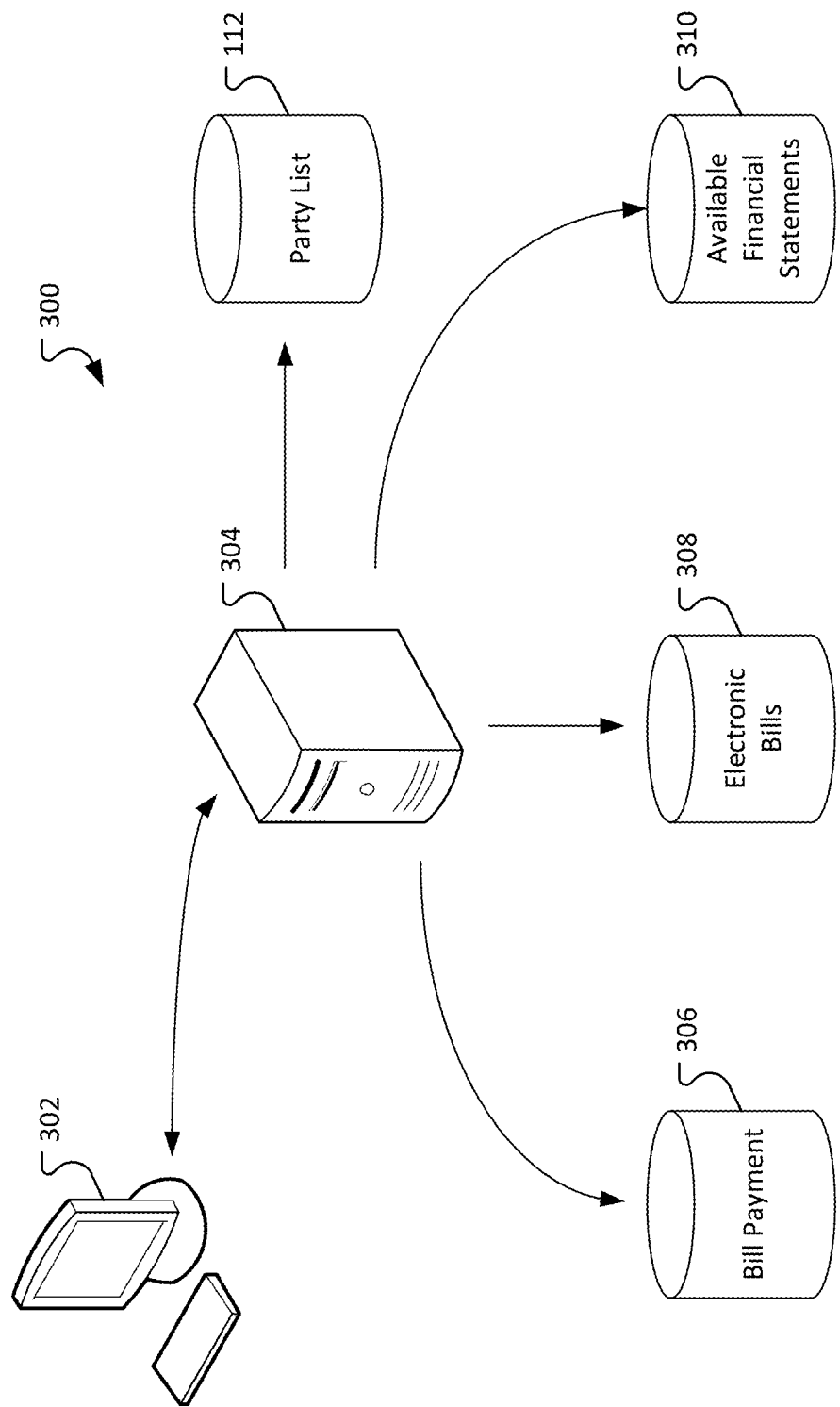
FIG. 3 illustrates an example of an environment that includes a system identifying parties to receive change of address notifications.

FIG. 3 illustrates an example of an environment 300 that includes a system 304 identifying parties to receive change of address notifications. The system 304 can be, for example, a computer system including a processor, memory, and have a non-transitory storage medium including program instructions that cause the processor to perform actions.

The system 304 can receive a request from a client device 302. The client device may be, for example, a personal computer, notebook, tablet, smart phone, or other device capable of connecting to a network and communicating with the system 304 while the system 304 and the client device 302 are online.

The request from the client device 302 may be a request to update the address of one or more users. The system 302 may update the user's data and ask the user if he wishes to update his address with other parties. In some implementations, the system 302 may receive a request to synchronize the user's address with the system 302 and a number of other parties. For example, the user may request that the system 302 notify other parties of the current address of the user.

The system 302 can determine parties that the user may wish to notify about the change of address. For example, the system can obtain electronic bill pay information from a bill pay database 306. The bill pay information may be associate with an electronic bill pay system, for example, an electronic bill pay system associated with a checking account at a financial institution.

The system can identify payees as possible recipients of the bill pay information. In some implementations, the system may select all payees as possible notification recipients. In other implementations, the system may select payees who have received a payment in a predetermined period of time (for example, in the previous three months, six months, or year).

The system 302 can determine parties that the user may wish to notify from electronic bills that are received by an electronic bill payment system. For example, the user may have their credit card automatically send statements to the bank as part of the electronic bill pay system. The electronic bill pay system may receive the statements and store the statements in a database 308. Alternatively, the system may obtain a predetermined number of statements from the credit card company in response to a user request to propagate a change of address. In some implementations, the user may authorize the system 304 to access financial statements from other parties directly (represented by the available financial statements data source 310). For example, a user may provide the system with their usernames and passwords for various other financial institutions. The system may access the user's financial statements from these various other financial institutions and collect them for analysis.

The financial statements can include several line items which correspond to different charges that the user has made (for example using a credit card).

Some of these charges may be to individuals the user may wish to notify of the change of address. For example, the user may charge his mobile telephone, utilities, car payments, tuition, subscriptions or other goods and services directly to their credit card. The system 302 can examine the statements to identify these parties. The statements may be provided in a predetermined format (for example, a spreadsheet, comma separated values file, etc.) or the system 302 can parse the statement programmatically using, for example, regular expressions.

In some implementations, the system 302 compares the charging party with a list that contains a number of different known parties (for example the party list 112). For example, a user charges his sports magazine subscription on his credit card. Annually, a charge of $50 to SPORTS MAG LLC may appear on the user's credit card statement. The system compares the entries in the statement with the known parties on the list and identifies that SPORTS MAG LLC is a party that a user is likely to wish to notify of the change of address.

Some parties may be associated with services for a particular residence or address. For example, utilities (for example, gas and electric) are generally for with a particular address. The system 302 can identify these parties and offer to close the corresponding accounts on behalf of the user. Alternately or additionally, the system 302 can offer to move the service to the new residence.

Once the list of potential parties has been created the list may be sent to the client device 302 for user review, as discussed further below.

In some implementations, after the user selects or approves the parties to be notified of the change of address, the system 302 may notify the parties of the change of address. In some scenarios, some parties may be notified using electronic communications (for example, network requests sent over the Internet). The electronic communication may be sending a network message to the party (for example, using a change of address API established by the party, or between the party and the system 302) or may be performed by having the system 30 to automatically log in to the user's account for the party and automatically changing the address (for example, using scripting). In other scenarios, a change of address notification may be generated and physically sent (for example, mailed) to the party.

The user may be required to authorize the system to make the change of address on the user's behalf. For example, by agreeing to a limited power of attorney or other similar mechanism. In some implementations, the user may need to electronically sign the documents.

Figure 4:
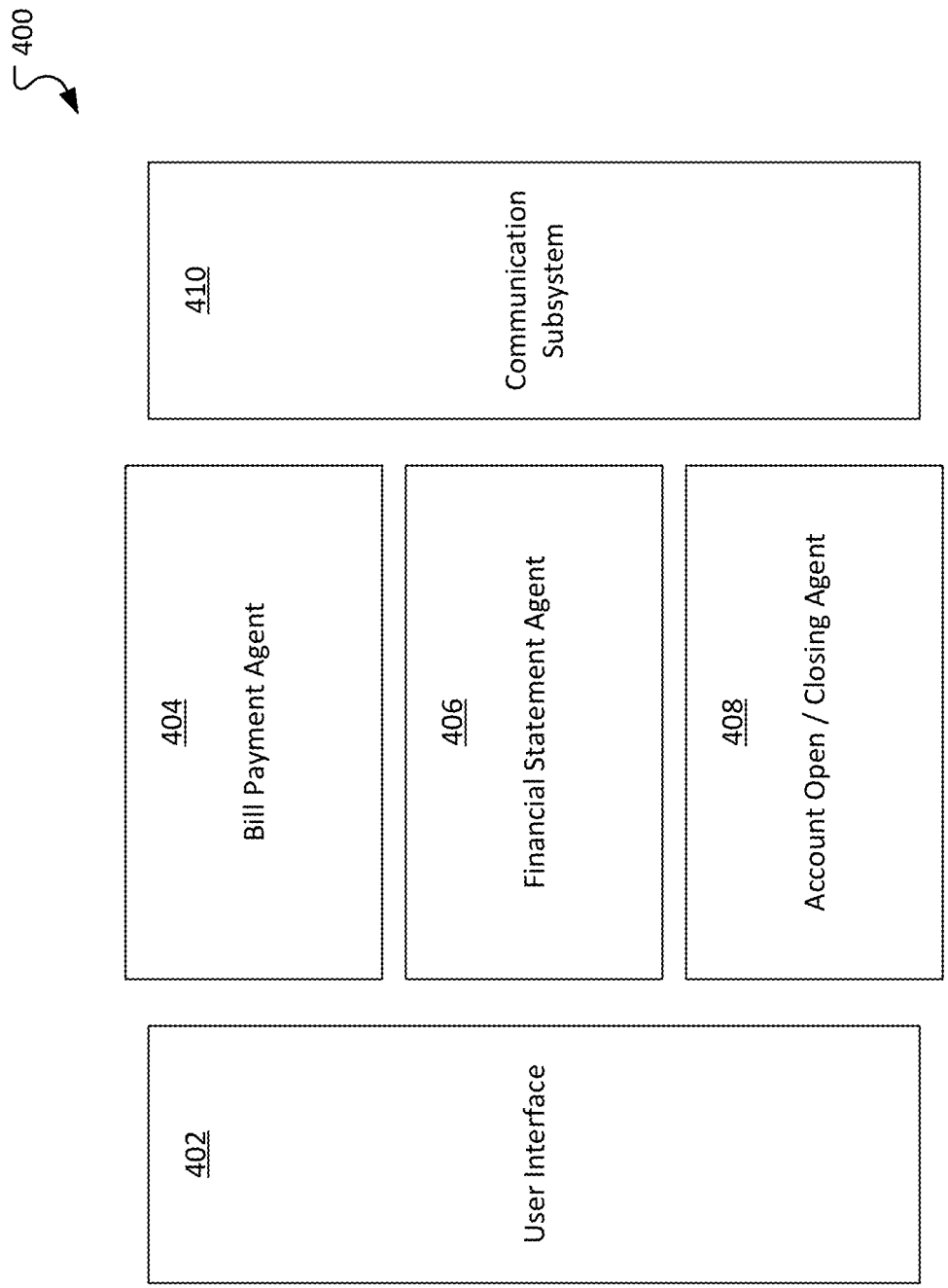
FIG. 4 is an architecture for an example system for notifying parties of change of address.

FIG. 4 is an architecture for an example system for notifying parties of change of address. The system 400 includes a user interface component 402. The user interface component 402 may provide user interfaces (such as HTML screens) to a user over a network (e.g. the Internet). The user interface component 402 may store information necessary to maintain a communication session using a stateless protocol such as the Hyper-Text Transport Protocol (HTTP).

The system 400 may include a bill payment agent 404. The bill payment agent 404, may be responsible for accessing information from electronic bill payment system. The electronic bill payment system may be separate from the system 400. The bill payment agent 404 may be responsible for obtaining and interpreting data from the electronic bill pay system.

The system 400 may include a financial statements agent 406. The financial systems agent 406 may be responsible for obtaining financial statements from one or more different financial institutions (such as credit cards, checking accounts, etc.). The financial systems agent 406 may extract data from the financial statements, translate the data into a form understandable by the system 400.

The system 400 may include an account open/closing agent 408. The account open/closing agent 408 may close accounts associated with an old residence or address. In some implementations, the account open/closing agent 408 may open a new account associated with the new residence.

The system 400 may include a communication subsystem. The communication subsystem may be responsible for managing communications with third parties (such as third party financial institutions and the parties who are the intended recipients of the change of address).

Figure 5:
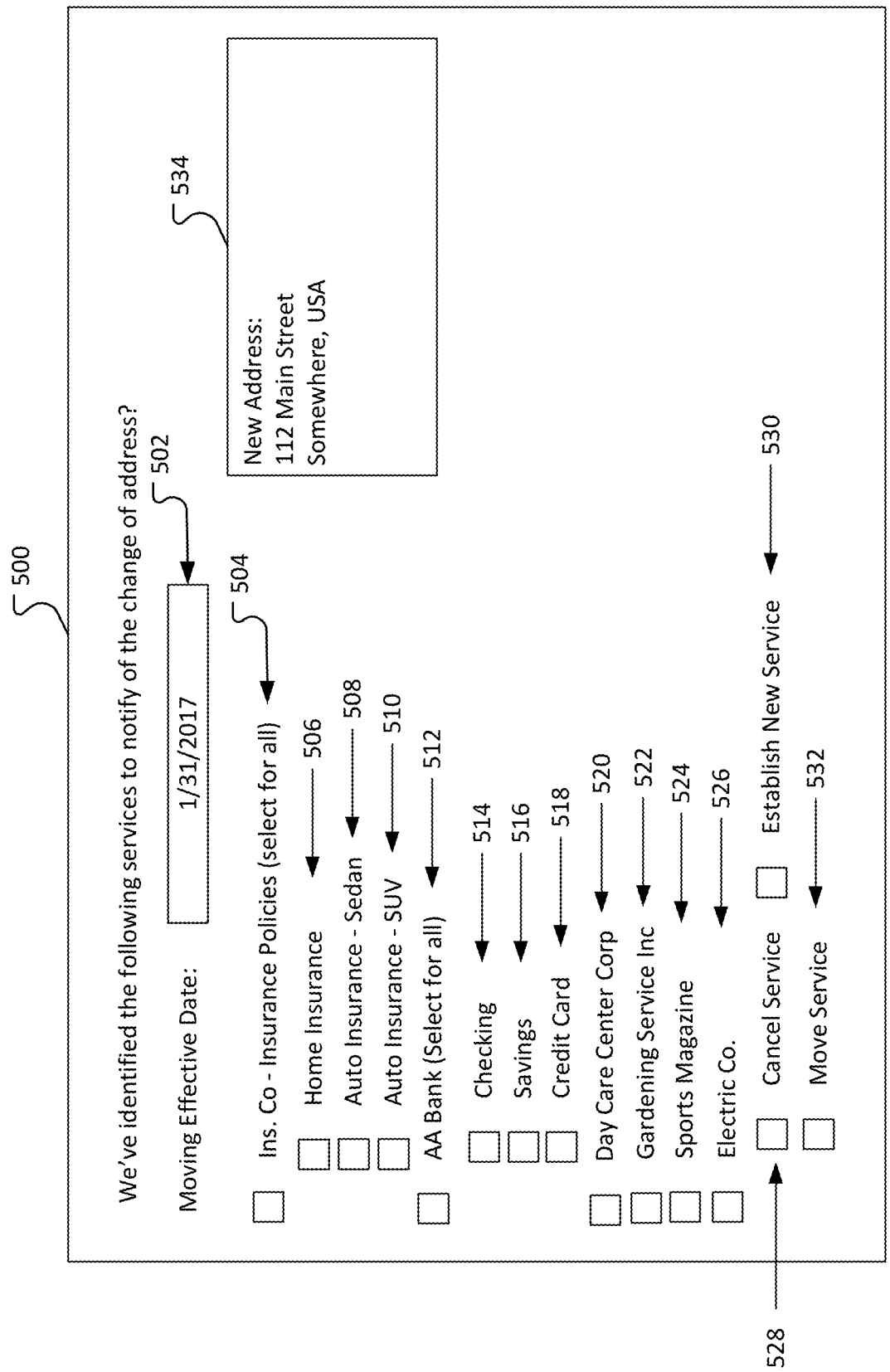
FIG. 5 illustrates an example of a user interface for changing a user's address.

FIG. 5 illustrates an example of a user interface 500 for changing a user's address. The user interface 500 includes a field 502 that allows the user to specify the moving date. In this example, the user has specified a date of "1/31/2017." In some implementations, the user interface 500 may include fields 5434 that enable a user to specify a new address.

The user interface 500 is populated with a list of the parties that the system has identified. In some scenarios, a user may have multiple accounts with a single company. In this example, the user has three accounts with Ins. Co. 504 (Home Insurance 506, Auto Insurance—Sedan 508, Auto Insurance—SUV 510). The user may select all three accounts by selecting the checkbox next to Ins. Co. 504. Alternatively, the user may individually select each account separately.

In this example, the user has three accounts with AA Bank 512 (Checking 514, Savings 516, and Credit Card 518).

As described above, the system can identify parties to notify based on an electronic bill pay system and from financial statements. For example, the Day Care Center Corp 520 and the Electric Co. 526 may have been identified from an electronic bill pay system. The Sports Magazine 524 may have been identified from a credit card statement. The Gardening Service Inc 522 may have been identified from a check written against a checking account.

In some implementations, the user interface may provide the ability for a user to cancel an existing account. For example, the Electric Co., corresponding to the electric service at the residence, may be canceled. If the user selected the Cancel Service 528 checkbox, the system may send a cancellation notice to the Electric Co. In some implementations, the user interface may provide the ability to establish new service 530 for the same type of utility (here, electric service). In scenarios in which multiple companies provide the same service to the new address, the user interface may provide a way to select providers (for example, a drop down list). If the same company provides service at the new residence, the user may be given the option to move the service 532.

Figure 6:
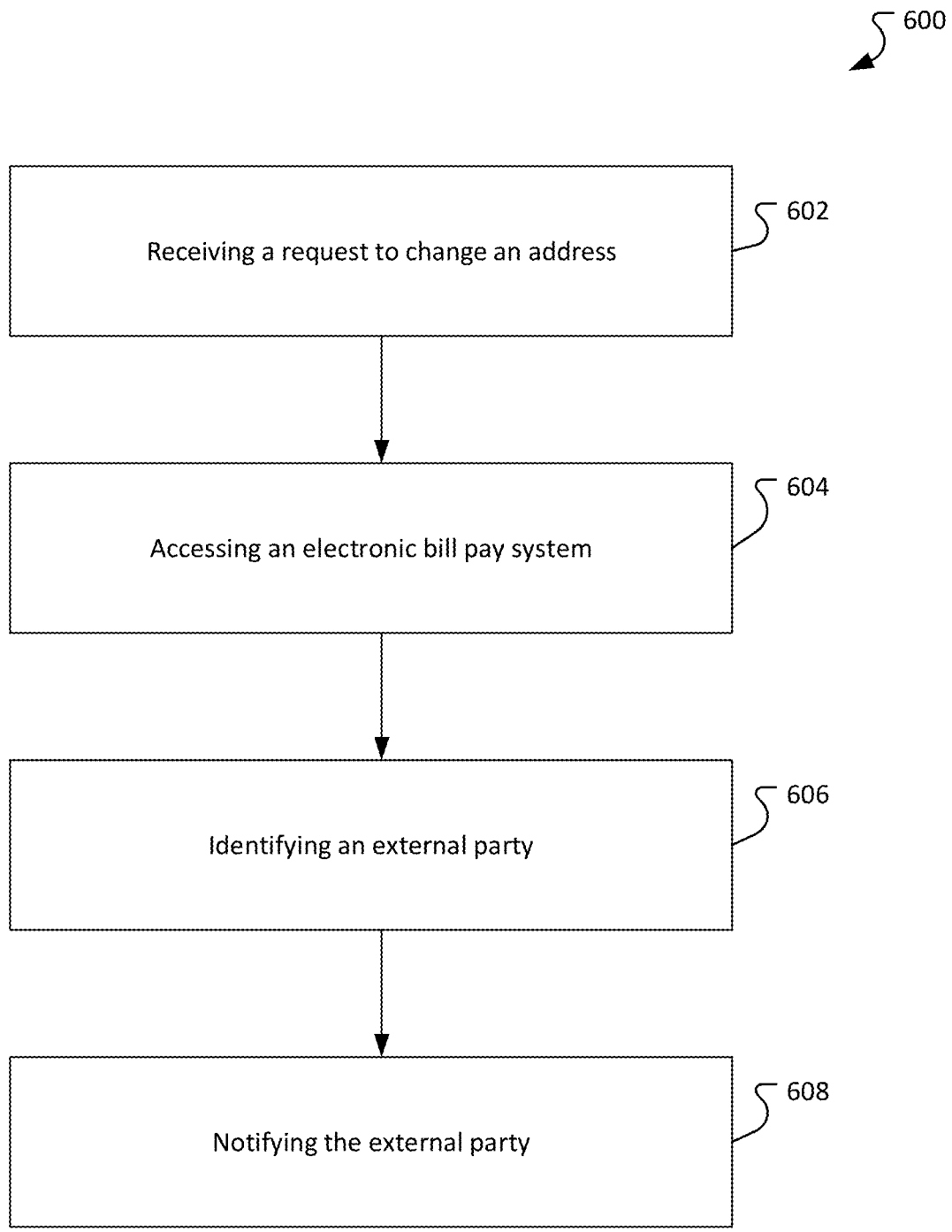
FIG. 6 is a flow chart of an example process for the efficient propagation of user data across disparate systems.

FIG. 6 is a flow chart of an example process for the efficient propagation of user data across disparate systems. The process can be performed by a computer system, having a processor and a non-transitory memory storing instructions that cause the processor to perform steps in the process.

The process 600 receives 602 a request to change an address with a financial institution. The request may be received from a client device over the Internet.

The process 600 accesses 604 an electronic bill pay system of the financial institution. The electronic bill pay system may be associated with an account of the user with the financial institution (such as a checking or investment account). The electronic bill pay system may include a list of payees that the user had previously established. The electronic bill pay system can also receive electronic bills and statements from other parties (for example, utility bills, credit card statements, mortgage and loan statements, etc.).

The process 600 identifies (604) an external party to notify of the change of address based on data in an electronic bill pay system.

The process 600 notifies (606) the external party of the change of address. The communication may be sent through an established channel to the external party. For example, using an API or message protocol that is established between the financial institution and the external party. The communication may also be sent using conventional means (such as the postal mail).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    identifying, by a computer system, one or more first external parties, wherein the identifying is in response to receiving a request from a user device to modify an address with a first financial institution associated with the user, wherein the one or more first external parties are to receive a notification of the modification of address or a cancellation notice based on first data obtained from a first database of the first financial institution;

obtaining, by the computer system, secure access to a second financial institution associated with the user using one or more credentials received from the user, the second financial institution being independent of the first financial institution;

identifying, by the computer system, one or more second external parties, wherein the identifying is based on second data obtained from a second database of the second financial institution, wherein the one or more second external parties are to receive a notification of the modification of address or a cancellation notice, the identifying comprising:

generating a list of known parties the user may wish to notify of the modification of address;

retrieving, from memory, data records representing one or more financial statements associated with a financial account that the user has with the second financial institution;

analyzing the data records representing the one or more financial statements to identify one or more charging parties that have charged the financial account of the user; and comparing the one or more charging parties with the list of known parties to identify the one or more second external parties;

causing the user interface of the user device to display a single user interface comprising a plurality of user-selectable icons including:

a first user-selectable icon, selection of which instructs the computer system to transmit a notification of the modification of address to one or more first external parties associated with one or more first accounts or to the one or more second external parties associated with the one or more first accounts for which the user wants to change the address, and a second user-selectable icon, selection of which instructs the computer system to transmit a cancellation notice to one or more first external parties associated with one or more second accounts or to the one or more second external parties associated with the one or more second accounts for which the user wants to cancel service;

wherein the first user-selectable icon is juxtaposed to the second user-selectable icon in the user interface; and in response to receiving the user's selections of the first and second user-selectable icons, automatically accessing and reading, from a hardware storage device, one or more data structures representing the one or more first accounts, modifying, by the computer system using scripting, one or more field values of the one or more data structures in accordance with the change of address, writing, to the hardware storage device, the one or more data structures with the one or more modified field values, automatically sending, via a first application programming interface (API), the notification of the change of address to one or more external parties associated with the one or more first accounts, the first API being established between the computer system and the one or more external parties associated with the one or more first accounts; and automatically sending, via a second application programming interface (API), the cancellation notice to one or more external parties associated with the one or more second accounts, the second API being established between the computer system and the one or more external parties associated with the one or more second accounts.

2. The computer-implemented method of claim 1, wherein the plurality of user-selectable icons allow the user to indicate, with respect to at least one of the one or more first external parties or one or more second external parties, which service should be cancelled at an old address and established at a new address.

3. The computer-implemented method of claim 1, wherein the request is received through the user interface, the user interface comprising one or more fields that allow a user to specify a new address corresponding to the modification of address and an effective date corresponding to the modification of address.

4. The computer-implemented method of claim 1, further comprising accessing an electronic bill pay system of the first financial institution to obtain the first data, wherein the first data represents recipients of a payment from the electronic bill pay system.

5. The computer-implemented method of claim 1, wherein the second data represents one or more financial statements of the user, the one or more financial statements being associated with one or more financial accounts of the user at the second financial institution.

6. The computer-implemented method of claim 5, wherein the one or more financial accounts comprises one or more of: a checking account or a credit card account.

7. The computer-implemented method of claim 1, wherein the one or more credentials of the user is provided by the user.

8. A non-transitory computer storage medium encoded with computer program instructions that when executed by one or more computers cause the one or more computers to perform operations comprising:

identifying, by a computer system, one or more first external parties, wherein the identifying is in response to receiving a request from a user device to modify an address with a first financial institution associated with the user, wherein the one or more first external parties are to receive a notification of the modification of address or a cancellation notice based on first data obtained from a first database of the first financial institution;

obtaining, by the computer system, secure access to a second financial institution associated with the user using one or more credentials received from the user, the second financial institution being independent of the first financial institution;

identifying, by the computer system, one or more second external parties, wherein the identifying is based on second data obtained from a second database of the second financial institution, wherein the one or more second external parties are to receive a notification of the modification of address or a cancellation notice, the identifying comprising:

generating a list of known parties the user may wish to notify of the modification of address;

retrieving, from memory, data records representing one or more financial statements associated with a financial account that the user has with the second financial institution;

analyzing the data records representing the one or more financial statements to identify one or more charging parties that have charged the financial account of the user; and comparing the one or more charging parties with the list of known parties to identify the one or more second external parties;

causing the user interface of the user device to display a single user interface comprising a plurality of user-selectable icons including:

a first user-selectable icon, selection of which instructs the computer system to transmit a notification of the modification of address to one or more first external parties associated with one or more first accounts or to the one or more second external parties associated with the one or more first accounts for which the user wants to change the address, and a second user-selectable icon, selection of which instructs the computer system to transmit a cancellation notice to one or more first external parties associated with one or more second accounts or to the one or more second external parties associated with the one or more second accounts for which the user wants to cancel service;

wherein the first user-selectable icon is juxtaposed to the second user-selectable icon in the user interface; and in response to receiving the user's selections of the first and second user-selectable icons, automatically accessing and reading, from a hardware storage device, one or more data structures representing the one or more first accounts, modifying, by the computer system using scripting, one or more field values of the one or more data structures in accordance with the change of address, writing, to the hardware storage device, the one or more data structures with the one or more modified field values, automatically sending, via a first application programming interface (API), the notification of the change of address to one or more external parties associated with the one or more first accounts, the first API being established between the computer system and the one or more external parties associated with the one or more first accounts; and automatically sending, via a second application programming interface (API), the cancellation notice to one or more external parties associated with the one or more second accounts, the second API being established between the computer system and the one or more external parties associated with the one or more second accounts.

9. The non-transitory computer storage medium of claim 8, wherein the plurality of user-selectable icons allow the user to indicate, with respect to at least one of the one or more first external parties or one or more second external parties, which service should be cancelled at an old address and established at a new address.

10. The non-transitory computer storage medium of claim 8, wherein the request is received through the user interface, the user interface comprising one or more fields that allow a user to specify a new address corresponding to the modification of address and an effective date corresponding to the modification of address.

11. The non-transitory computer storage medium of claim 8, the operations further comprising accessing an electronic bill pay system of the first financial institution to obtain the first data, wherein the first data represents recipients of a payment from the electronic bill pay system.

12. The non-transitory computer storage medium of claim 8, wherein the second data represents one or more financial statements of the user, the one or more financial statements being associated with one or more financial accounts of the user at the second financial institution.

13. The non-transitory computer storage medium of claim 12, wherein the one or more financial accounts comprises one or more of: a checking account or a credit card account.

14. The non-transitory computer storage medium of claim 8, wherein the one or more credentials of the user is provided by the user.

15. A system comprising:

one or more computers and one or more storage devices storing instructions that are operable, when executed by the one or more computers, to cause the one or more computers to perform operations comprising:

identifying, by a computer system, one or more first external parties, wherein the identifying is in response to receiving a request from a user device to modify an address with a first financial institution associated with the user, wherein the one or more first external parties are to receive a notification of the modification of address or a cancellation notice based on first data obtained from a first database of the first financial institution;

obtaining, by the computer system, secure access to a second financial institution associated with the user using one or more credentials received from the user, the second financial institution being independent of the first financial institution;

identifying, by the computer system, one or more second external parties, wherein the identifying is based on second data obtained from a second database of the second financial institution, wherein the one or more second external parties are to receive a notification of the modification of address or a cancellation notice, the identifying comprising:

generating a list of known parties the user may wish to notify of the modification of address;

retrieving, from memory, data records representing one or more financial statements associated with a financial account that the user has with the second financial institution;

analyzing the data records representing the one or more financial statements to identify one or more charging parties that have charged the financial account of the user; and comparing the one or more charging parties with the list of known parties to identify the one or more second external parties;

causing the user interface of the user device to display a single user interface comprising a plurality of user-selectable icons including:

a first user-selectable icon, selection of which instructs the computer system to transmit a notification of the modification of address to one or more first external parties associated with one or more first accounts or to the one or more second external parties associated with the one or more first accounts for which the user wants to change the address, and a second user-selectable icon, selection of which instructs the computer system to transmit a cancellation notice to one or more first external parties associated with one or more second accounts or to the one or more second external parties associated with the one or more second accounts for which the user wants to cancel service;

wherein the first user-selectable icon is juxtaposed to the second user-selectable icon in the user interface; and in response to receiving the user's selections of the first and second user-selectable icons,
- automatically accessing and reading, from a hardware storage device, one or more data structures representing the one or more first accounts,
- modifying, by the computer system using scripting, one or more field values of the one or more data structures in accordance with the change of address,
- writing, to the hardware storage device, the one or more data structures with the one or more modified field values,
- automatically sending, via a first application programming interface (API), the notification of the change of address to one or more external parties associated with the one or more first accounts, the first API being established between the computer system and the one or more external parties associated with the one or more first accounts; and
- automatically sending, via a second application programming interface (API), the cancellation notice to one or more external parties associated with the one or more second accounts, the second API being established between the computer system and the one or more external parties associated with the one or more second accounts.

16. The system of claim 15, wherein the plurality of user-selectable icons allow the user to indicate, with respect to at least one of the one or more first external parties or one or more second external parties, which service should be cancelled at an old address and established at a new address.

17. The system of claim 15, wherein the request is received through the user interface, the user interface comprising one or more fields that allow a user to specify a new address corresponding to the modification of address and an effective date corresponding to the modification of address.

18. The system of claim 15, the operations further comprising accessing an electronic bill pay system of the first financial institution to obtain the first data, wherein the first data represents recipients of a payment from the electronic bill pay system.

19. The system of claim 15, wherein the second data represents one or more financial statements of the user, the one or more financial statements being associated with one or more financial accounts of the user at the second financial institution.

20. The system of claim 19, wherein the one or more financial accounts comprises one or more of: a checking account or a credit card account.

* * * * *